United States Patent
Purushothaman

(10) Patent No.: US 10,678,645 B2
(45) Date of Patent: Jun. 9, 2020

(54) DYNAMIC REROUTING OF THE EXECUTION FOR AUTOMATED SERVER BUILDS

(71) Applicant: Bank of America Corporation, Charlotte, NC (US)

(72) Inventor: Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 348 days.

(21) Appl. No.: 15/807,737

(22) Filed: Nov. 9, 2017

(65) Prior Publication Data

US 2019/0138395 A1    May 9, 2019

(51) Int. Cl.
    *G06F 11/14*    (2006.01)
(52) U.S. Cl.
    CPC .... *G06F 11/1405* (2013.01); *G06F 2201/805* (2013.01)
(58) Field of Classification Search
    CPC ................ G06F 11/1405; G06F 11/16; G06F 2201/805; G06F 11/07
    See application file for complete search history.

(56) References Cited

U.S. PATENT DOCUMENTS

| 5,991,543 | A | * | 11/1999 | Amberg ................ G06F 11/28 717/175 |
| 6,282,711 | B1 | | 8/2001 | Halpern et al. |
| 6,760,903 | B1 | | 7/2004 | Morshed et al. |
| 7,062,755 | B2 | | 6/2006 | Partamian et al. |
| 9,329,982 | B2 | | 5/2016 | Arif et al. |
| 9,367,427 | B2 | | 6/2016 | Andre et al. |
| 9,436,589 | B2 | | 9/2016 | Li et al. |
| 9,575,874 | B2 | | 2/2017 | Gautallin et al. |
| 9,658,936 | B2 | | 5/2017 | Krajec et al. |
| 9,665,474 | B2 | | 5/2017 | Li et al. |
| 2004/0133665 | A1 | | 7/2004 | Deboer et al. |
| 2013/0042234 | A1 | | 2/2013 | DeLuca et al. |
| 2013/0111034 | A1 | | 5/2013 | Upadhya |
| 2015/0128121 | A1 | | 5/2015 | Garcia |

* cited by examiner

*Primary Examiner* — Matthew M Kim
*Assistant Examiner* — Indranil Chowdhury
(74) *Attorney, Agent, or Firm* — Weiss & Arons LLP; Michael A. Springs, Esq.

(57) ABSTRACT

An architecture for a server build is provided. The architecture may include a plurality of execution stages which may be divided into a plurality of steps. Each of the execution stages may be implemented on a server to complete a server build request. The architecture may further include an execution stage selector configured to identify, within a plurality of servers, a server that may have an availability to execute the request. The selector may be further configured to execute the request on the available server and record the order of each of the plurality of steps within each of the plurality of execution stages being executed on the server. In response to a failure, the selector may be configured to pause execution, determine a failed step within the execution stage, analyze the prior executed steps, and determine any prior executed steps that the failed step may depend from.

15 Claims, 2 Drawing Sheets

DYNAMIC REROUTING OF THE EXECUTION FOR AUTOMATED SERVER BUILDS

FIELD OF TECHNOLOGY

Aspects of the invention relate to automated server builds. Specifically, the invention relates to remediating issues in an automated server build.

BACKGROUND OF THE DISCLOSURE

Building servers entails numerous stages of execution. Each stage of execution typically encompasses a plurality of steps necessary for completion of the stage. These steps are not explicitly split up and individualized.

There are many issues and failures that occur during a server build process. Conventionally, when a server build fails, the entire execution stage requires repetition of execution. Each of the plurality of steps within the execution stage is repeated. The repetition of all the steps may not be necessary and may often increase the time required for the successful completion of the server build.

It would be desirable, therefore, to have systems and methods for dividing up the stages into a plurality of steps efficiently remediating issues in a server build.

SUMMARY OF THE DISCLOSURE

Methods for executing a server build is provided. The method may include receiving a server build request.

The method may further include identifying, within a group of servers, a server having an availability to execute the server build request. When the availability is determined, the method may further include assigning the server build request to the available server.

The method may further include retrieving a plurality of execution stages associated with the server build request. Each of the plurality of execution stages may be divided into a plurality of steps.

Each of the execution stages may comprise an executable code module. Each of the executable code modules may be divided into a plurality of executable code module components. Each of the plurality of steps may correspond to at least one of the plurality of executable code module components.

In response to the request, the method may further comprise, building the server. The building of the server may comprise executing each of the plurality of steps within each of the execution stages.

The building of the server may further comprise, tracking the order of each step within each stage of the server build.

In response to a failure occurring at one of the execution stages, the method may further comprise, performing a remedial sequence of actions. The remedial sequence of actions may include pausing the server build at the execution stage where the failure occurred.

The remedial sequence of actions may further include determining a failed step within the execution stage. Upon determination of the failed step, the method may further include repeating execution at the failed step, or at one or more prior executed steps. It may not be necessary to repeat all the previously executed steps and stages.

When the failure occurs, the method may include analyzing all of the prior executed steps within the execution stage where the failure occurred and within other previously executed execution stages. The analyzing may determine any prior executed steps that the failed step may depend from.

In the event that the failed step depends from one or more prior executed steps, the execution may be repeated at the pre-determined prior executed step or steps. The repeating of the prior executed steps may be necessary at a step executed immediately prior to the failed step. The repeating of the prior executed steps may be necessary for all steps that are within the execution stage of the failed step. In certain events, the repeating may be necessary at a step within an execution stage prior to the execution stage of the failed step.

When the failed step is determined not to be dependent from one or more prior executed steps, the execution may need to be repeated only at the failed step.

After the execution is repeated at any of the necessary prior executed steps, the execution of the server build may resume.

In certain embodiments, the method may include repairing the failure prior to repeating execution. The repairing of the failure may include retrieving a set of action codes that may be stored on a database. The set of action codes may have successfully repaired a failure similar to the failure that may be occurring at one of the execution stages. The set of action codes retrieved may be executed at the failed step to repair the failure. The set of action codes retrieved may be executed at one of the prior executed steps to repair the failure.

When the set of action codes does not successfully repair the failure, the method may further include generating a generated set of action codes. The generating may be based on a combination of a plurality of recorded behavior patterns of stored historical failures, a plurality of recorded metadata associated with the stored historical failures, and a plurality of sets of action codes that successfully repaired historical failures.

After the failure is repaired and the execution is repeated at any of the necessary prior executed steps, the execution of the server build may resume.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
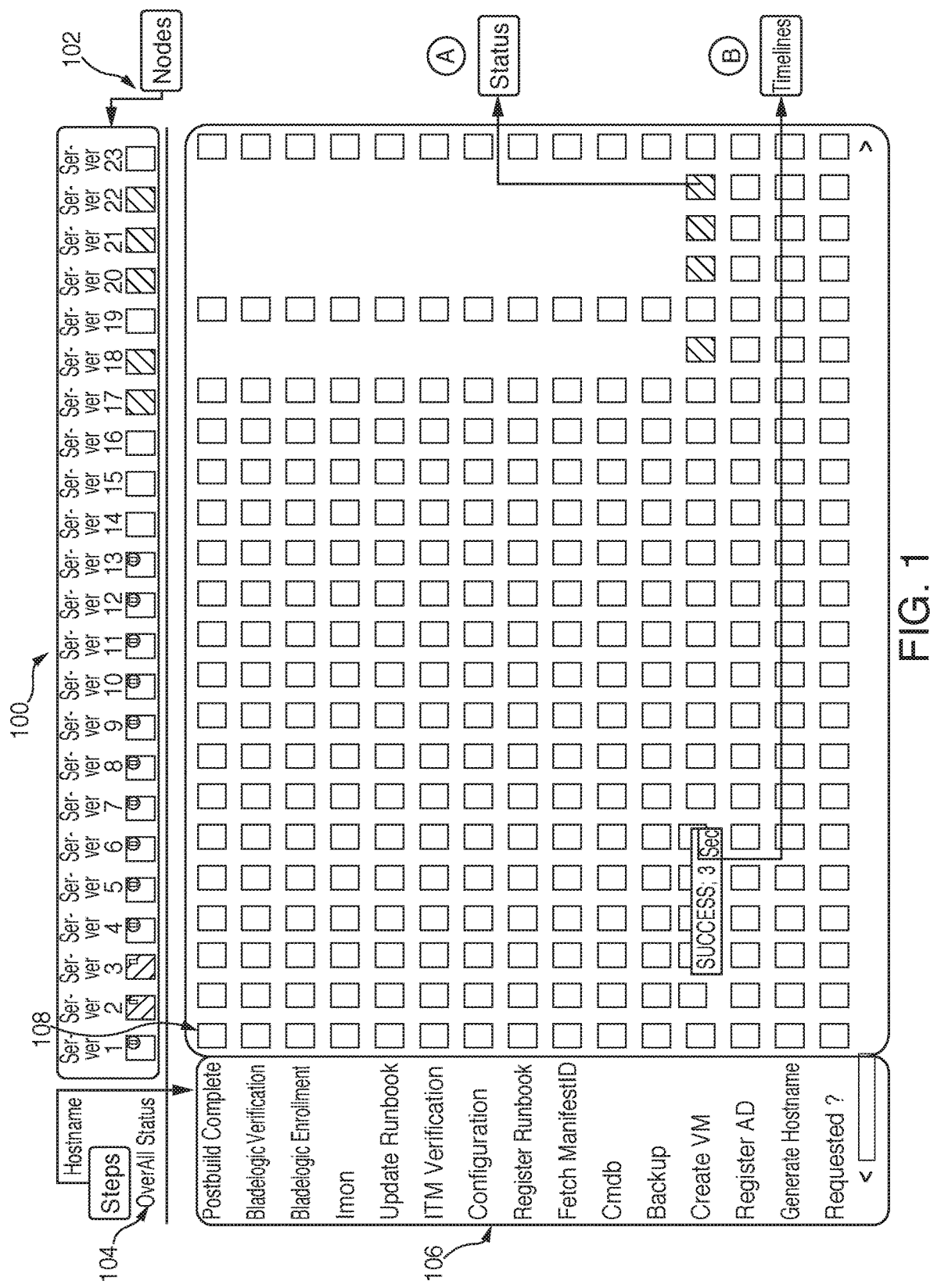
FIG. 1 shows an illustrative conventional graphical user interface ("GUI").

An architecture for a server build is provided. The architecture may include a plurality of execution stages. Each of the plurality of execution stages may be divided into a plurality of steps. Each of the execution stages may be implemented on a server for performing and completing a server build request.

The architecture may further include an execution stage selector. The execution stage selector may be configured to identify, within a plurality of servers, the server that may have an availability to execute the server build request.

The execution stage selector may be further configured to execute the server build request on the available server. The execution selector may record the order of each of the plurality of steps being executed. Each of the plurality of steps may be within each of the plurality of execution stages that may be executed on the server.

A failure may occur during execution of the server build. In response to the failure, the execution stage selector may be configured to pause the execution at the execution stage where the failure occurred. The execution stage selector may be further configured to determine a failed step within the execution stage.

The execution stage selector may further be configured to analyze all of the prior executed steps within the execution stage where the failure occurred and within other previously executed execution stages, and may determine any prior executed steps that the failed step may depend from.

The failure may necessitate repeating execution at the failed step. The failure may necessitate repeating execution at a prior step. The prior step may be based on an analysis of prior steps affected by the failed step.

In certain embodiments a method for building a plurality of servers based on a receipt of a submission is provided. The submission may comprise a plurality of requirements. The method may include generating a server build request in order to fulfill the plurality of requirements of the submission.

The method may further include identifying, from the plurality of servers, the servers having an availability for executing the request.

In response to the request, the method may further include dividing the request into a plurality of segments. Each of the plurality of segments may be assigned to an available server. Each of the plurality of segments may be associated with the request.

The method may further include retrieving a plurality of execution stages for each of the plurality of segments. Each of the plurality of execution stages may be divided into a plurality of steps. Each of the execution stages may comprise an executable code module. Each of the executable code modules may be divided into a plurality of executable code module components. Each of the plurality of steps may correspond to at least one of the plurality of executable code module components.

An example of an executable code module may be instantiating a connectivity instance. For example, one of the sets of steps that may be taken during a server build process are to connect two or more pieces of hardware. There may be a PC that needs to connect to a server. There may be a PC that needs to connect to an Ad Server. In order to instantiate this connectivity instance, several steps may be necessary. In the event that at one of the steps a failure occurs, it may not be necessary to restart the instance from the first step.

The method may further include building each of the available servers. The building may comprise executing each of the plurality of steps within each of the execution stages for each segment. The building may further include tracking the order of each step within each execution stage.

In response to a failure occurring at one of the execution stages within one of the plurality of segments, the building may further include performing a remedial sequence of actions. The remedial sequence of actions may include pausing the building at the execution stage of the server where the failure occurred. The remedial sequence of actions may further include determining a failed step within the execution stage and repeating execution at the failed step or at a prior step. The prior step may be based on an analysis of prior steps affected by the failed step.

Concurrently, the method may further include continuous building of the remaining plurality of servers.

When the execution at the failed step is successfully executed, the method may further include resuming the building of the server where the failure had occurred.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of the methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method or another method described herein.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative conventional graphical user interface ("GUI") associated with server build process 100. The GUI displays the building of a plurality of nodes 102. Nodes may be referred to herein, in the alternative, as servers. A plurality of execution stages 106 may be executed for each server included in the plurality of servers 102. Each of the execution stages 106 may be necessarily executed for each individual server in order to build each server. Each execution stage may consist of several steps. Each step may be required to be successfully executed.

Overall status display frame 104 may display the status of the server build process for each of the servers. For example, overall status display frame 104 associated with server 1 may display a green color. The green color may indicate that all of the execution stages have been successfully completed for server 1 and, therefore, the server build process has been successfully completed.

Overall status display frame 104 associated with server 2 may display a red color. The red color may indicate that a failure and/or error occurred at one or more of the stages included in the associated server build process. It should be appreciated that a portion of the stages may have successfully been completed prior to the failure. For example, stages—initiate request, generate hostname and register active directory ("AD") may have been successfully completed prior to a failure occurring at create virtual machine ("VM") stage. The failure may be indicated by a red color in a display frame associated with server 2 and the create VM stage.

Using conventional mechanisms, it cannot be determined at which step, within the create VM stage, the failure occurred. The failure may have occurred upon completion of the majority of steps within the create virtual machine ("VM") stage. The failure may have occurred at the first step within the create VM stage. As a result of the failure, the system may display a red color in the status display associated with both server 2 and the create VM stage. All steps included in the create VM stage, as well as all steps included in any previous stages that act as the basis for the failed stage, may require repetition in order to successfully complete the server build process. Repetition of the failed stages, as well as the previous stages that act as the basis for the failed stage, may be time consuming and waste computing resources. Therefore, a system in accordance with the embodiments described in connection with FIG. 2 is desirable and is described below.

Figure 2:
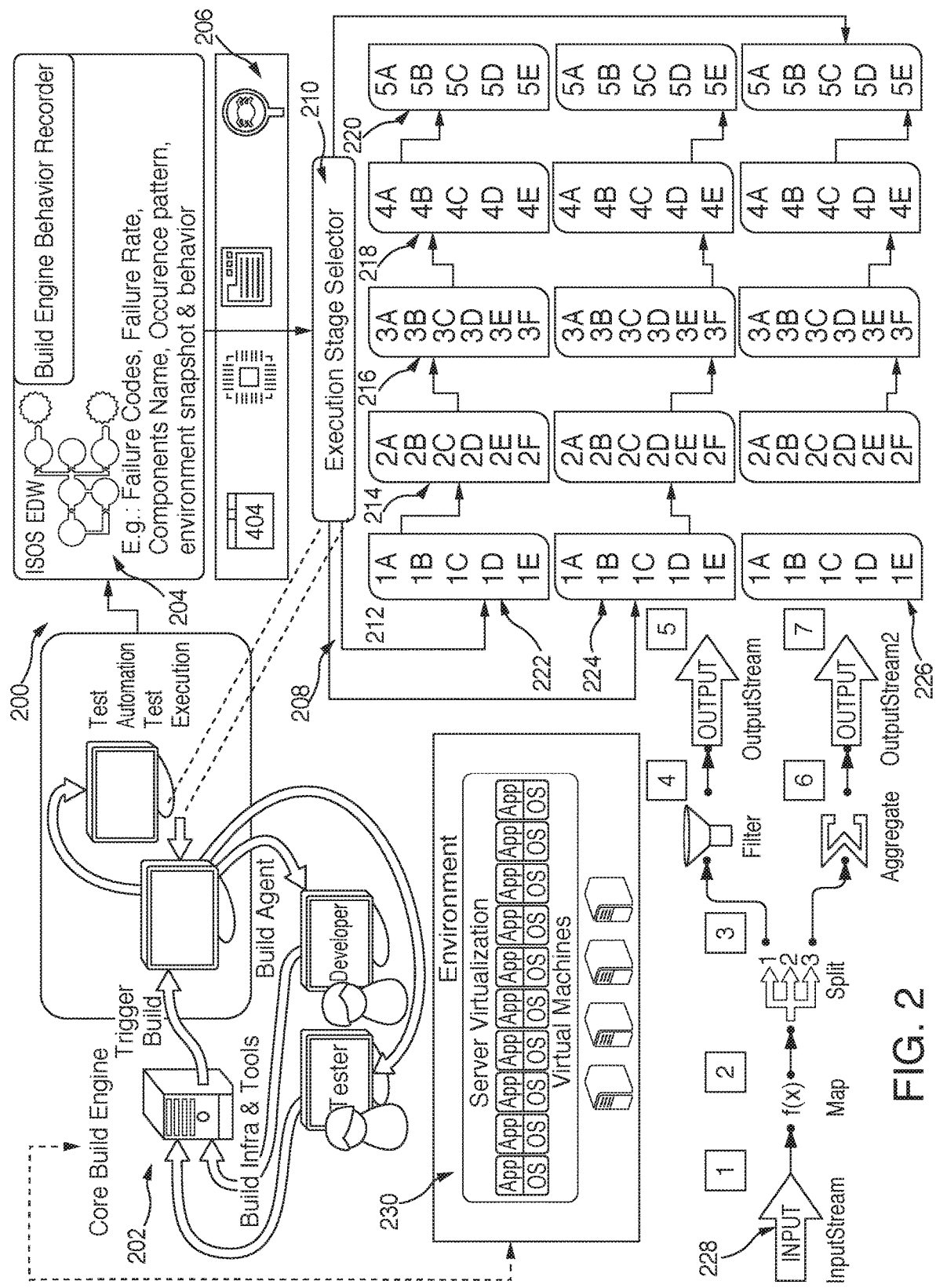
FIG. 2 shows an illustrative diagram according to certain embodiments.

FIG. 2 shows an illustrative diagram 200 of a server build process. Core build engine 202 may be a visual depiction of the overall server build process. Core build engine 202 depicts the setup of the build engine for a server build 200. Core build engine 202 encompasses multiple components of the server build process 200. This may include server instance creation components, build agent, communicating mechanisms, tools and testing automation models.

Build engine behavior recorder 204 may be a machine learning module. Build engine behavior recorder 204 may be enabled to learn different behaviors of the servers. Build engine behavior recorder 204 may record metadata and behavior patterns of each of the plurality of servers during the execution stages of the server build. Metadata recorded may include failure codes associated with failures 206 occurring during the server build. Metadata recorded may include the rate of the failures 206. Failure rate may include how often the failure is occurring. Metadata recorded may include component names. These component names may correspond to the component in which one or more of failures 206 occurred. Metadata recorded may include other general details associated with the servers being built not listed here.

The behavior patterns recorded may include a snapshot of the environment. The snapshot may assist in the prevention of a similar failure occurring during the server build process.

Behavior patterns recorded may include the occurrence pattern for each of the failures 206. The occurrence pattern may include the location where the failure occurred. The location may be the step and/or stage where execution failed. The occurrence pattern may include the time that each failure 206 occurred.

Build engine behavior recorder 204 may enable new action codes to be generated based on previous recorded behaviors. The action codes may be necessary to invoke when execution fails. The action codes may be executed on one of the servers where one or more of the failures 206 occurred. The action codes may be invoked to repair the one or more failures 206.

Server build graph 208 may show a graph of a server build process. In one embodiment, server build graph 208 shows examples of paths taken for remediating failures and resuming execution of server builds upon remediation of the failures. Execution of server build 222 may start execution of the building at execution stage 212 and follow thereafter with stages 214, 216, 218, and 220. Each of execution stages 212-220 may include a plurality of steps. Execution stage 212 may include steps 1A-1E. Execution stage 214 may include steps 2A-2F. Execution stage 216 may include steps 3A-3F. Execution stage 218 may include steps 4A-4E. Execution stage 220 may include steps 5A-5E. The order of the execution of each of the steps within each stage are recorded in a database within core build engine 202 by the execution stage selector 210.

When execution fails at one of the execution stages 212-220, execution stage selector 210 may determine the step that failed within the execution stage.

The execution stage selector 210 may further be configured to analyze all of the prior executed steps within the execution stage where execution failed and within other previously executed execution stages, and may determine any prior executed steps that the failed step may depend from.

The failure may necessitate repeating execution at the step where execution failed. The failure may necessitate repeating execution at a prior step. The prior step may be based on an analysis of prior steps affected by the failed step.

In certain instances, if execution fails at step 3B within execution stage 216, execution stage 216 may not need to be repeated in its entirety. Execution stages 212-214 may also not need to be repeated. Execution stage selector 210 may determine that step 1A of execution stage 212, step 2C of execution stage 214 and step 3B of execution stage 216 require repeating execution prior to resuming the server build at step 4A of execution stage 218.

Server build 224 and 226 may depict other examples of a server build and the paths taken for repeating execution when execution fails. Execution stage selector 210 may repeat execution at different previously executed steps for different instances.

In another embodiment, server build graph 208 may depict a server build request divided into three segments in response to a submission retrieved as shown at 222, 224 and 226.

Execution stage selector 210 may divide the server build request into segments when the submission entails a plurality of requirements. A plurality of server builds may be necessary in order to fulfill the plurality of requirements of the submission.

The process of dividing the submission into segments on the plurality of servers, and building each of the servers is shown at 228, steps 1-7.

Step 1 may show an input stream associated with a submission retrieved requiring a server build. At step 2 a function may be performed to divide the submission into several segments. The splitting of the submission may be shown at step 3. Once the submission is split, the execution stages for each segment are executed on a server to build each of the servers according to the requirements of the submission. A filter function may be performed at step 4, and then outputted as an output stream at step 5. In some cases, the results from the server build are aggregated at step 6 and then outputted as an output stream at step 7.

Environment 230 may be a visual depiction of a plurality of servers that may be in connection with the server build.

Thus, methods and apparatus for remediating issues in an automated server build have been provided. Persons skilled in the art will appreciate that the present invention can be practiced by other than the described embodiments, which are presented for purposes of illustration rather than of limitation. The present invention is limited only by the claims that follow.

What is claimed is:

1. A method for executing a server build, said method comprising:
receiving a server build request;
identifying, within a group of servers, a server having an availability to execute the server build request;
assigning the server build request to the available server;
retrieving a plurality of execution stages associated with the server build request, each of the plurality of execution stages divided into a plurality of steps; each of the execution stages comprising an executable code module, each of the executable code modules being divided into a plurality of executable code module components, each of the plurality of steps corresponding to at least one of the plurality of executable module components;

in response to the request, building the one or more servers, the building comprising executing each of the plurality of steps within each of the execution stages;

tracking the order of each step within each stage of the server build;

in response to a failure occurring at one of the execution stages, performing a remedial sequence of actions, the remedial sequence of actions including:

pausing the server build at the execution stage where the failure occurred;

determining a failed step within the execution stage; and repeating execution at the failed step, or at a prior step, said prior step being selected based on an analysis of prior steps affected by the failed step.

2. The method of claim 1 wherein at least one of the executable code modules comprises instantiating a connectivity instance.

3. The method of claim 1 wherein at least one of the executable code modules comprises creating a dynamic software library.

4. The method of claim 1 wherein the repeating of execution at the prior step further comprises, repeating the step executed immediately prior to the failed step.

5. The method of claim 1 wherein the repeating of execution at the prior step further comprises, repeating all steps that are within the execution stage of the failed step.

6. The method of claim 1 wherein the repeating of execution at the prior step further comprises, repeating the execution stage prior to the execution stage of the failed step.

7. The method of claim 1 wherein, upon completion of repeating the execution, resuming execution of the server build at a step following the failed step.

8. The method of claim 1 wherein the repeating of execution at or before the failed step further comprises repairing the failure prior to repeating, the repairing comprising:

retrieving a set of action codes, said set of action codes stored on a database, said set of action codes that successfully repaired a failure similar to the failure occurring at one of the execution stages; and executing the set of action codes at or before the failed step, on the server, to repair the failure.

9. The method of claim 8 wherein, when the set of action codes is not successful in repairing the failure, the method further comprises generating a generated set of action codes, said generating being based on a combination of:

a plurality of recorded behavior patterns of stored historical failures;

a plurality of recorded metadata associated with the stored historical failures; and a plurality of sets of action codes that successfully repaired historical failures.

10. The method of claim 9 further comprising executing the generated set of action codes on the server, to repair the failure.

11. A method for building a plurality of servers, said method comprising:

receiving a submission, the submission comprising a plurality of requirements;

generating a server build request in order to fulfill the plurality of requirements of the submission;

identifying, a number of servers, from the plurality of servers, the number of servers having an availability to execute the request;

in response to the request:

dividing the request into a plurality of segments;

assigning each of the plurality of segments to an available server;

retrieving a plurality of execution stages for each of the plurality of segments associated with the request, each of the plurality of execution stages divided into a plurality of steps; each of the execution stages comprising an executable code module, each of the executable code modules corresponding to each of the plurality of requirements, each of the executable code modules being divided into a plurality of executable code module components, each of the plurality of steps corresponding to at least one of the plurality of executable module components;

building each of the available servers, the building comprising executing each of the plurality of steps within each of the execution stages for each segment;

tracking the order of each step within each execution stage;

in response to a failure occurring at one of the execution stages of one of the segments, performing a remedial sequence of actions, the remedial sequence of actions including:

pausing the building at the execution stage of the server where the failure occurred;

determining a failed step within the execution stage; and repeating execution at the failed step, or at a prior step, said prior step being selected based on an analysis of prior steps affected by the failed step.

12. The method of claim 11 wherein the pausing further comprises, pausing the server where the failure occurred and continuous building of the servers that did not incur the failure.

13. The method of claim 11 wherein at least one of the executable code modules comprise instantiating a connectivity instance.

14. The method of claim 11 wherein at least one of the executable code modules comprise creating a dynamic software library.

15. The method of claim 11 wherein the repeating of execution at the first step further comprises repairing the failure prior to repeating execution, the repairing comprising:

retrieving a set of action codes, said set of action codes stored on a database, said set of action codes that successfully repaired a failure similar to the failure occurring at the failed step; and executing the set of action codes at or before the failed step, on the server, to repair the failure.

* * * * *